(12) United States Patent
Myers

(10) Patent No.: US 6,810,968 B2
(45) Date of Patent: Nov. 2, 2004

(54) PARALLEL CYLINDER LIFT STRUCTURE FOR AN IMPLEMENT

(75) Inventor: Brian E. Myers, Altoona, IA (US)

(73) Assignee: Deere & Company, Moline, IL (US)

( * ) Notice: Subject to any disclaimer, the term of this patent is extended or adjusted under 35 U.S.C. 154(b) by 82 days.

(21) Appl. No.: 10/298,989

(22) Filed: Nov. 15, 2002

(65) Prior Publication Data

US 2004/0094314 A1 May 20, 2004

(51) Int. Cl.[7] ............................................ A01B 63/00
(52) U.S. Cl. ................................................... 172/452
(58) Field of Search ........................ 172/310, 311, 172/452–465, 776, 2, 4, 9, 239, 126, 401–410; 91/1, 536, 518–528; 60/579, 546; 280/5.514, 121.103

(56) References Cited

U.S. PATENT DOCUMENTS

| | | | | |
|---|---|---|---|---|
| 3,476,016 A | * | 11/1969 | Dixon et al. | ................... 91/520 |
| 3,627,053 A | | 12/1971 | Hook et al. | ...................... 172/9 |
| 4,241,641 A | * | 12/1980 | Reinert | ...................... 91/189 A |
| 4,423,664 A | * | 1/1984 | Buchl | ............................... 91/1 |
| 4,821,806 A | | 4/1989 | Winter | ........................... 172/4 |
| 5,427,182 A | * | 6/1995 | Winter | ........................... 172/2 |
| 5,957,218 A | | 9/1999 | Noonan et al. | ............. 172/239 |
| 6,000,315 A | * | 12/1999 | Graham et al. | ............... 91/520 |
| 6,036,206 A | * | 3/2000 | Bastin et al. | ............ 280/124.1 |
| 6,293,352 B1 | * | 9/2001 | Hundeby et al. | ........... 172/456 |
| 6,318,477 B1 | * | 11/2001 | Bettin | ......................... 172/452 |

OTHER PUBLICATIONS

Deere & Company, patent application filed on Nov. 15, 2002 entitled "Strucuture for Converting an Integral Implement to a Drawn Type".

\* cited by examiner

*Primary Examiner*—Robert E Pezzuto

(57) ABSTRACT

Double acting cylinders on wheel lift structures of an agricultural implement are connected in parallel and include pilot operated check valve structure connected to the base ends of the cylinders to maintain timing of the lift wheel structure even under large differential loads without a rockshaft or other mechanical timing device extending between the wheel structures. The check valve structure prevents unwanted cylinder retraction and provides cylinder lock-up for transport without need for additional valves. When pressure is applied to the rod ends of the cylinders, the check valve structure allows fluid to flow from base ends. Orifices are inserted at the base ends of the cylinders 86 to provide optimum breakoff pressure for the check valves.

10 Claims, 2 Drawing Sheets

PARALLEL CYLINDER LIFT STRUCTURE FOR AN IMPLEMENT

FIELD OF THE INVENTION

The present invention relates generally to agricultural implements, and more specifically to hydraulic lift structure for such implements.

BACKGROUND OF THE INVENTION

Agricultural implements with relatively large transversely extending frames typically include spaced lift wheel assemblies controlled by hydraulic cylinders. The lift wheel assemblies must be timed and remain generally in phase for level lift operation. Many implements include transversely extending rockshafts connecting the wheel assemblies for operation in unison. Various hydraulic circuit arrangements are available to operate the rockshafts and limit torsional wind-up of the rockshafts as uneven loads are encountered across the width of the implement frame. In implements wherein lift and/or gauge wheels are widely spaced at varying locations relative to the implement frame, provision of an economically feasible wheel lift and timing system is a continuing challenge. Often, there simply is insufficient space for mechanical timing structures such as rockshafts.

Series cylinder circuits such as shown in U.S. Pat. No. 3,627,053 have been widely used to provide level lift features. Such circuits often require rephasing cylinders or special rephrasing valves and matched cylinders, and large reaction forces are encountered by cylinders. Other circuits such as shown in U.S. Pat. No. 4,821,806 include valve and conduit structure providing parallel cylinder operation while permitting the operator to change to a fast raise/fast lower series mode wherein flow control structure causes the lift cylinders to operate substantially in series for raising and lowering the implement in level fashion across its width to and from a transport position.

In another type of structure, such as shown in U.S. Pat. No. 5,957,218, lift cylinders are individually controlled by a computer or other electronic control arrangement. This type of control is complex and costly and usually requires feedback transducers. A relatively simple and inexpensive lift system which is easily adaptable to placement of lift wheel assemblies at different locations on an implement frame without need for rockshafts for timing is needed.

SUMMARY OF THE INVENTION

It is therefore an object of the present invention to provide an improved lift wheel structure for an implement. It is a further object to provide such a structure which overcomes most or all of the aforementioned problems.

It is a further object of the invention to provide an improved lift structure for an implement which is relatively simple and inexpensive. It is a further object to provide such a structure which facilitates mounting of lift wheels at widely spaced locations on the frame. It is still another object to provide such a structure which does not require a rockshaft connection between spaced wheel assemblies to maintain timing of the assemblies.

It is a further object to provide an improved lift wheel structure for an implement which facilitates a simple parallel connection of lift cylinders. It is a further object to provide such a structure which maintains cylinder timing even under large differential loading of the cylinders. It is another object to provide such a structure having an automatic lock-up function so that separate lock-up valves are obviated.

To prevent the wheels of spaced lift wheel assemblies from getting out of phase, a hydraulic system includes a parallel circuit with pilot operated check valves on the base or lift end of each double-acting cylinder. The check valves lock hydraulic fluid into the base end of each cylinder and prevent uneven loads from changing the relative extension of the cylinders. The pilot is operated off the rod or lower end of each cylinder. Therefore, when the machine is lowered by applying fluid pressure to the rod ends of the cylinders, the check valve opens and allows oil flow out of the base end. An orifice is used to provide the optimum breakoff pressure for the check valve.

The hydraulic system eliminates need for costly rephasing cylinders and avoids the high reaction forces of a traditional series circuits. If desired, the hydraulic lock-up valve normally used during storage and machine maintenance can be eliminated because the check valves provide the same function.

These and other objects, features and advantages of the present invention will become apparent to one skilled in the art upon reading the following detailed description in view of the drawings.

DESCRIPTION OF THE PREFERRED EMBODIMENT

Figure 1:
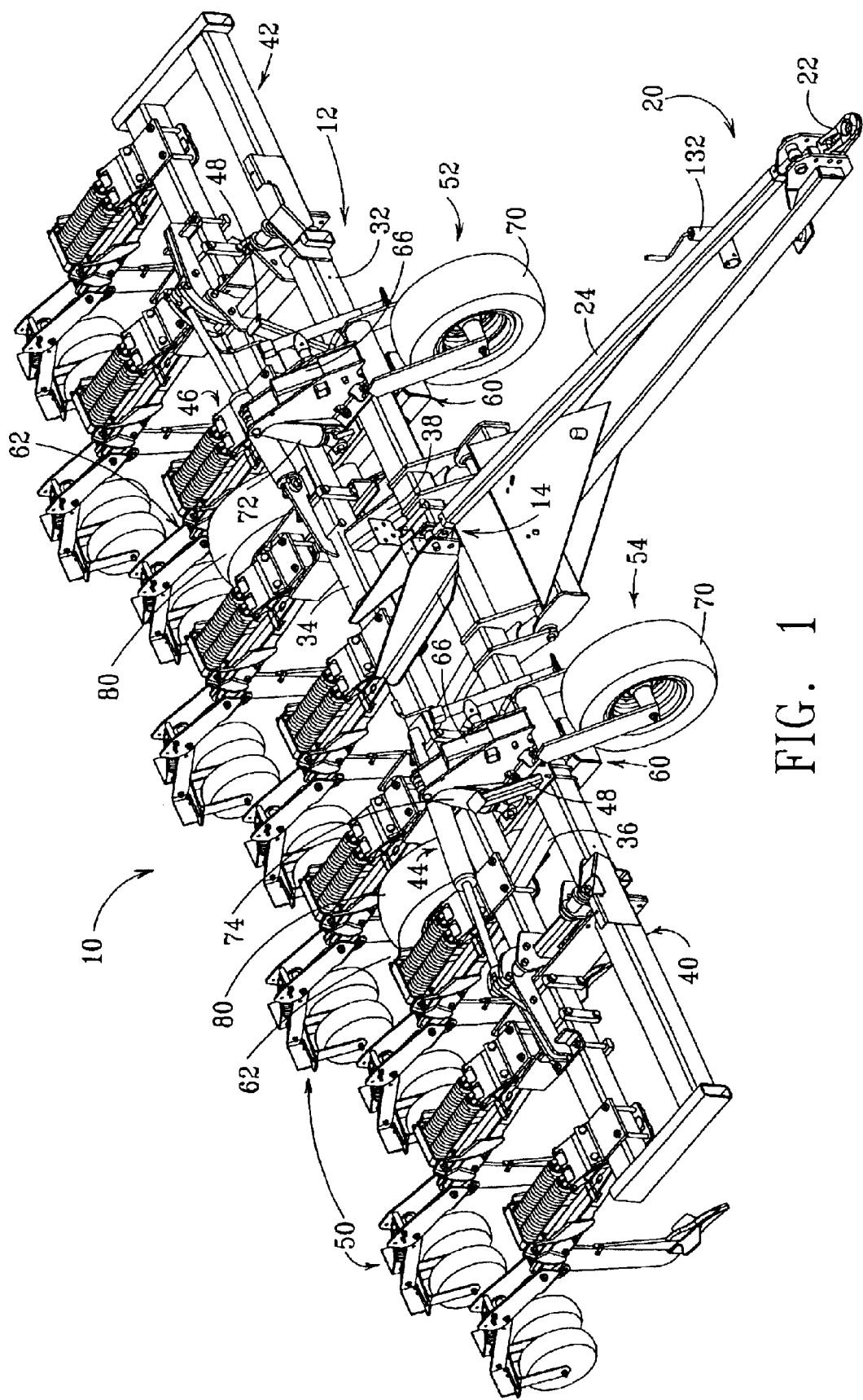
FIG. 1 is a front perspective view of a tillage implement with hitch and wheel module structure attached utilizing a parallel cylinder hydraulic system.

Referring now to FIG. 1, therein is shown an implement 10 such as a ripper or similar deep tillage implement having a main frame 12 and conventional three-point hitch structure 14 adapted for attachment to a three-point hitch (not shown) on a tractor or other towing vehicle. The implement 10 is shown with attachments for conversion to a towed implement. A hitch 20 is pivotally connected at a rearward end to the lower two attaching points of the three-point hitch structure 14. A standard towing connection 22 for attachment to the tractor drawbar is connected to the forward end of the hitch 20. A leveling link 24 extends between the towing connection 22 and the upper connection of the three point hitch structure 14 to provide a generally rigid but adjustable hitch connection to the frame 12.

The frame 12 as shown includes transversely extending front and rear frame members 32 and 34 connected by generally fore-and-aft extending frame members such as shown at 36 and 38. Wing frame sections 40 and 42 are pivotally attached at the ends of the main frame 12 and are pivotable from the working position shown upwardly and inwardly to a folded transport position by wing lift assemblies 44 and 46. The wing frame sections rest on frame-mounted supports 48 in the transport position. Ripper standards or other earth-engaging tools 50 are connected at transversely spaced locations to the frame members 32 and 34 and the wing frame sections 40 and 42.

To provide frame support, and lift and depth control functions when the implement 10 is converted from integral to towed, first and second wheel modules 52 and 54 are transversely spaced on the forward member 34 of the main frame 12. The modules 52 and 54, which are self-contained and do not require a mechanical timing element to maintain phase, are generally identical. Each module includes bracket structure 60 for attaching the module at selected one of various locations along the frame 12, depending on the locations of the tools 50 and other hardware on the frame. A lift wheel assembly 62 is pivotally connected to the bracket structure 60 below the frame 12. A rectangular gauge wheel arm 66 is slidably received by a mast 68 and extends diagonally upwardly in the rearward direction above the frame 12. The lower end of the gauge wheel arm 66 rotatably supports a vertically adjustable gauge wheel 70 which extends downwardly and forwardly of the frame member 34. Lift cylinders 72 and 74 are connected to the wheel modules 52 and 54, respectively, between the mast 70 and the lift wheel assemblies 62 to pivot the assemblies and move lift wheels 80 between lowered transport positions and raised field-working positions.

The depth adjustment range of the gauge wheels 70 is substantially less than the lift range of the lift wheels 80 between full retraction and full extension of the cylinders 72 and 74. When the cylinders 72 and 74 are fully extended and the implement 10 is in the raised transport position, the gauge wheels 70 are lifted from the ground, and the frame 12 is supported by the wheels 80 behind the center of gravity of the implement and by the forwardly extending hitch 20.

Normal field working depth is set by lowering the frame 12 by retracting the hydraulic cylinders 72 and 74 to raise the rear transport wheels 80 until the tools 50 penetrate the ground to the desired depth. The gauge wheels 70 are then moved firmly into contact with the ground and the arms 66 are pinned to the mast 68. The gauge wheels 70 extend forwardly of the frame member 34 and offset the moment resulting from the tool standard draft that tends to rotate the front of the implement downwardly.

Figure 2:
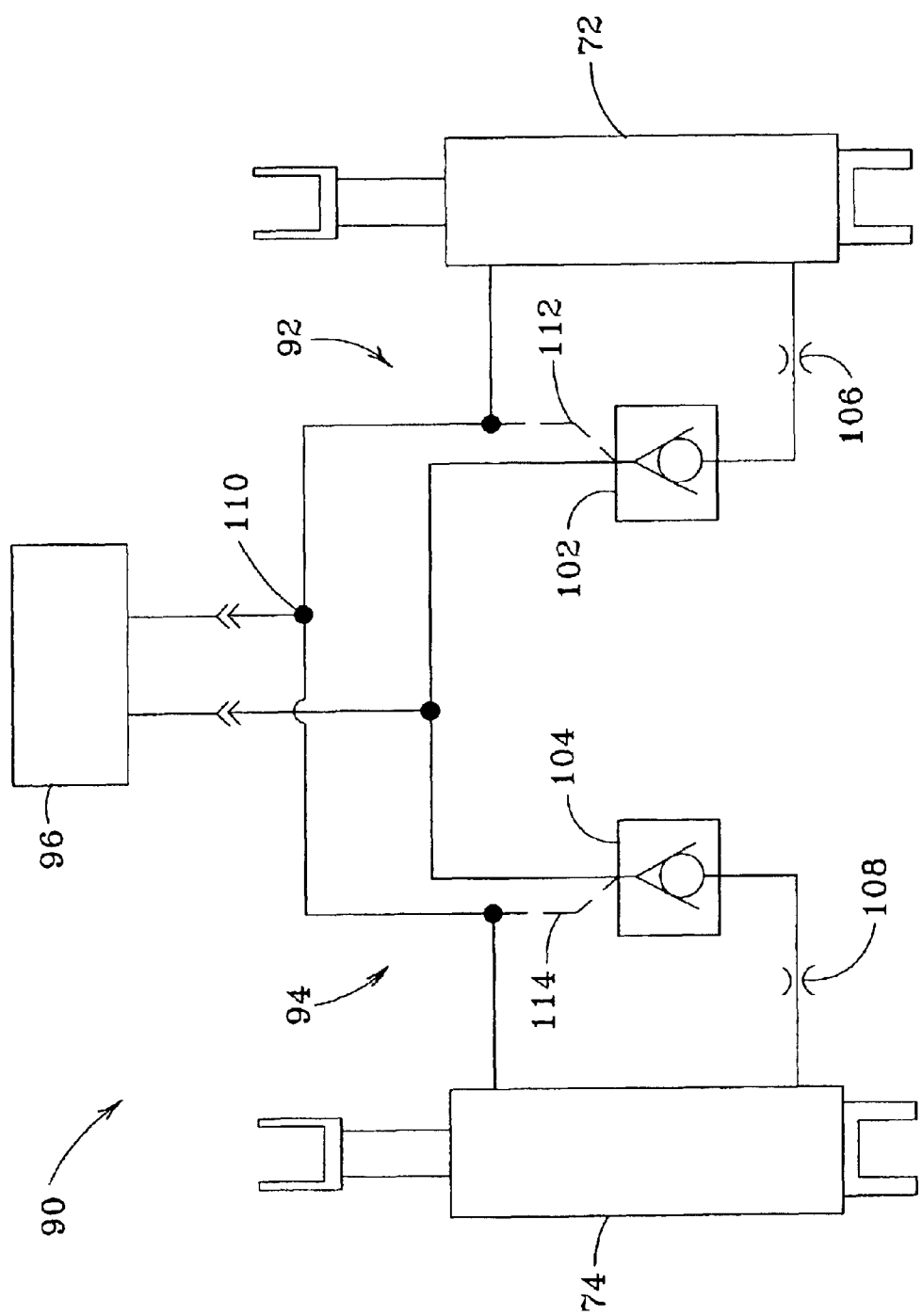
FIG. 2 is a schematic representation of the hydraulic system utilized with the implement of FIG. 1.

To prevent the transport wheels 80 on the wheel modules from getting out of phase as differing forces act on the cylinders 72 and 74, a hydraulic system indicated generally at 90 in FIG. 2 is provided. The system 90 includes hydraulic lines 92 and 94 connecting the cylinder 72 of the first wheel module 52 in parallel with the cylinder 74 of the second wheel module 54 to a source of hydraulic fluid under pressure 96 on the towing vehicle. A pressure line 98 is connected through first and second pilot operated check valves 102 and 104 and orifices 106 and 108 to the base ends of the cylinders 72 and 74. A return line 110 is connected between the source 96 and the rod ends of the cylinders 72 and 74. Pilot lines 112 and 114 are connected between the line 110 and the check valves 112 and 114, respectively. The source 96 includes a conventional selective control valve (SCV) or similar structure for pressurizing either of the lines 98 or 110 and returning the other line to reservoir.

When the line 98 is pressurized, the check valves 102 and 104 allow flow to the base ends of the cylinders 72 and 74 to extend the cylinders and move the transport wheels 80 downwardly relative to the frame 12. The rod ends of the cylinders 72 and 74 are connected to reservoir through the line 98 as the cylinders 86 are extended. Once the cylinders are extended, the check valves 102 and 104 prevent return flow through the line 98 even when the line 98 is no longer pressurized unless the pressure in the line 110 is above a preselected breakoff pressure.

When the operator wishes to retract the cylinders 72 and 74 to lower the frame 12, the SCV on the towing vehicle is operated to pressurize the rod end line 110 and return the line 98 to reservoir. When the fluid pressure in the line 110 reaches a valve breakoff level as sensed by the valves via the pilot lines 112 and 114, the check valves 102 and 104 will open to allow return flow from the base ends through the orifices 106 and 108 so the cylinders 72 and 74 retract to lower the frame 12. The check valves 102 and 104 prevent uneven loads on the cylinders 72 and 74 from changing relative extension of the cylinders so the cylinders remain in phase. The orifices 106 and 108 restrict return flow during cylinder retraction to provide the optimum breakoff pressure for the check valves 102 and 104. Hydraulic lock-up valves normally used during storage and machine maintenance can be eliminated because the check valves 102 and 104 provide the same function. With the cylinders extended, if the lines 92 and 94 are disconnected from the source 96, the check valves will not open to allow cylinder retraction until such time as the lines are reconnected and pressure above the breakoff pressure is applied to the rod ends through the line 110.

Having described the preferred embodiment, it will become apparent that various modifications can be made without departing from the scope of the invention as defined in the accompanying claims.

I claim:

1. A hydraulic circuit for lift wheel structure on an agricultural implement having a tool-supporting frame, the hydraulic circuit comprising:

first and second lift wheel assemblies connected at spaced locations on the frame and including first and second cylinders having first and second ends;

hydraulic lines connecting the cylinders to a source of hydraulic fluid under pressure for operation in parallel to extend and retract the cylinders and thereby raise and lower the frame; and first and second pilot operated valves connected to the lines and to the first ends of the cylinders, wherein the valves include a pilot port connected to the second ends of the cylinders and are operable to prevent movement of the cylinders to lower the frame when pressure at the second ends is below a preselected minimum pressure.

2. The hydraulic circuit as set forth in claim 1 further comprising orifice structure connected to the first ends of the cylinders to facilitate establishment of the preselected minimum pressure.

3. The hydraulic circuit as set forth in claim 1 wherein the first and second wheel assemblies comprise wheel lift modules selectively attachable at different locations along the frame without mechanical timing structure connected between the modules.

4. The hydraulic circuit as set forth in claim 1 wherein the cylinders are double acting and the first ends of the cylinders comprise cylinder rod ends and the second ends of the cylinders comprise base ends.

5. The hydraulic circuit as set forth in claim 4 further comprising orifice structure connected to the base ends of the cylinders for maintaining a pressure above the preselected pressure at the rod ends while the cylinders are retracting.

6. A hydraulic lift wheel structure on a agricultural implement having a tool-supporting frame, the hydraulic structure comprising:

first and second lift wheel assemblies connected at spaced locations on the frame and including first and second cylinders having rod and base ends;

selectively pressurized rod end and base end hydraulic lines connected to the rod and base ends, respectively, for operation of the cylinders in parallel, the base end line when pressurized extending the cylinders; and means for maintaining the cylinders in timed relation under differential loading of the cylinders, including means for preventing hydraulic flow from the base ends of the cylinders until the rod ends of the cylinders are pressurized.

7. The structure as set forth in claim 6 wherein the means for preventing hydraulic flow from the base ends comprises a pilot operated check valve connected to the base end line and having a pilot line connected to the rod end line for opening the check valve when the rod end line is pressurized to retract the cylinders.

8. The structure as set forth in claim 6 wherein the means for maintaining the cylinders in timed relation comprises first and second pilot operated valves having on and blocking conditions connected to the base ends of the cylinders, the valves including a pilot port connected to the rod ends of the cylinders, wherein the pilot operated valves are in the blocking condition to prevent movement of the cylinders to lower the frame when pressure at the rod ends is below a preselected minimum pressure.

9. The structure as set forth in claim 8 further comprising orifice structure connected to the base ends of the cylinders to facilitate establishment of the preselected minimum pressure at the rod ends when the rod end lines are pressurized and cause the valves to change from the blocking condition to the on condition.

10. The structure as set forth in claim 6 wherein the first and second lift wheel assemblies are characterized by the lack of a mechanical timing interconnection between the assemblies.

* * * * *